(12) United States Patent
Bader (10) Patent No.: US 9,033,850 B2
(45) Date of Patent: May 19, 2015

(54) METHOD FOR OPERATING A DRIVE TRAIN OF A VEHICLE

(71) Applicant: ZF FRIEDRICHSHAFEN AG, Friedrichshafen (DE)

(72) Inventor: Martin-Joachim Bader, Mochenwangen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 2 days.

(21) Appl. No.: 14/017,484

(22) Filed: Sep. 4, 2013

(65) Prior Publication Data

US 2014/0073479 A1    Mar. 13, 2014

(30) Foreign Application Priority Data

Sep. 13, 2012 (DE) .......................... 10 2012 216 304

(51) Int. Cl.
*B60W 10/02* (2006.01)
*B60W 20/00* (2006.01)
*B60K 6/48* (2007.10)

(52) U.S. Cl.
CPC .............. *B60W 20/10* (2013.01); *Y10T 477/26* (2015.01); *Y10S 903/902* (2013.01); *B60W 10/02* (2013.01); *B60K 2006/4825* (2013.01); *B60W 2540/30* (2013.01); *B60W 2710/023* (2013.01); *B60W 20/102* (2013.01); *Y02T 10/6252* (2013.01)

(58) Field of Classification Search
CPC ............ B60K 2741/02; B60K 2741/20; F16H 61/143; F16H 59/24; B60W 20/00; B60W 10/08; B60W 10/02; B60W 10/06
USPC ............ 477/5, 7, 8, 166, 168, 169, 174, 175, 477/180; 701/67, 68; 192/85.63
See application file for complete search history.

(56) References Cited

U.S. PATENT DOCUMENTS 7,316,283 B2   1/2008   Yamamoto et al.
7,757,831 B2   7/2010   Stehr et al.
(Continued)

FOREIGN PATENT DOCUMENTS

DE   10 2004 043 587 A1   3/2006
DE   60 2005 005 096 T2   6/2008
(Continued)

OTHER PUBLICATIONS

German Search Report issued in corresponding German application No. 10 2012 216 304.2 mailed Jun. 20, 2013.

*Primary Examiner* — Justin Holmes
(74) *Attorney, Agent, or Firm* — Davis & Bujold, P.L.L.C.; Michael J. Bujold (57) ABSTRACT

A method of operating a drive-train of a vehicle that comprises a combustion engine whose torque for driving the vehicle can be transmitted to a drive output via a transmission, with a hydraulically actuated clutch when the clutch is engaged. An electric machine provides torque which can act upon the drive-train. The clutch is closed by filling the clutch with hydraulic fluid through a circuit by way of a pump which can be driven by the engine and the electric machine. The method is to engage the clutch when the combustion engine is initially off and/or when the electric machine is initially switched off, determining a driving dynamic based on the behavior of the driver and adjusting the speed of the electric machine based on the determined driving dynamic such that the greater the determined driving dynamic is, the more rapidly the clutch is filled by the pump.

8 Claims, 6 Drawing Sheets

(56) References Cited

U.S. PATENT DOCUMENTS

| | | |
|---|---|---|
| 8,465,392 B2 | 6/2013 | Allgaier et al. |
| 8,483,898 B2 * | 7/2013 | Naqvi et al. ............ 701/22 |
| 8,517,892 B2 * | 8/2013 | Schulte et al. ............ 477/5 |
| 2006/0048516 A1 | 3/2006 | Tenbrock et al. |
| 2011/0120568 A1 | 5/2011 | Borntraeger et al. |
| 2011/0281685 A1 * | 11/2011 | Allgaier et al. ............ 477/4 |
| 2012/0238404 A1 | 9/2012 | Schiele et al. |

FOREIGN PATENT DOCUMENTS

| | | |
|---|---|---|
| DE | 10 2008 040 667 A1 | 1/2010 |
| DE | 10 2008 044 272 A1 | 6/2010 |
| DE | 10 2009 054 468 A1 | 6/2011 |
| DE | 20 2006 021 143 U1 | 5/2013 |

\* cited by examiner

METHOD FOR OPERATING A DRIVE TRAIN OF A VEHICLE

This application claims priority from German application serial no. 10 2012 216 304.2 filed Sep. 13, 2012

FIELD OF THE INVENTION

The invention concerns a method for operating a drive-train of a vehicle, particularly a motor vehicle.

BACKGROUND OF THE INVENTION

In the drive-train of a vehicle the drive aggregate, which in the case of a hybrid drive comprises an internal combustion engine and an electric machine, can be connected via a transmission device to a drive output. In the transmission device a hydraulically actuated clutch is often used, by virtue of which the torques of the internal combustion engine or electric machine are transferred to the drive output when the clutch is closed. To actuate the clutch and appropriate shifting elements in the transmission device a hydraulic fluid circuit is provided, which by means of a hydraulic pump provides a system pressure sufficient for actuating the clutch and for engaging gears.

The document DE 10 2008 040 667 A1 describes a hydraulic system of a transmission device for a vehicle, with a main transmission pump and an auxiliary pump. The main transmission pump is powered primarily by the internal combustion engine and the auxiliary pump by an electric machine of the vehicle.

The document DE 10 2008 044 272 A1 describes a method for operating a hybrid drive-train of a vehicle which comprises a transmission device with hydraulically actuated shifting elements. The transmission device has a hydraulic system with an oil pump device which can be driven both by the internal combustion engine and by the electric machine of the drive-train.

If a hydraulic fluid circuit with a hydraulic pump is used in a transmission device of a drive-train, in which the pump can be operated by both an electric machine and also by the internal combustion engine of the drive-train, the filling of the clutch by means of the hydraulic pump while the internal combustion engine is at first switched off takes place by means of the electric machine. During this the electric machine operates without taking account of a driver's wish.

SUMMARY OF THE INVENTION

The purpose of the present invention is to provide a method for operating a drive-train of a vehicle, in which the closing of the clutch in the drive-train can be flexibly adapted.

The method according to the invention serves for operating the drive-train of a vehicle, such that the drive-train comprises an internal combustion engine whose torque can be transmitted to a drive output of the drive-train by a transmission device provided in the drive-train, the transmission having a hydraulically actuated clutch, when the clutch is in its closed condition. In this case an electric machine is also provided, whose torque acts upon the drive-train. Depending on the design, the electric machine can serve only for starting the internal combustion engine or it can also be provided for driving the vehicle via the drive-train. The closing of the clutch is brought about by filling the clutch of the transmission device with hydraulic fluid from a hydraulic fluid circuit by means of a hydraulic pump. In this case the hydraulic pump can be powered both by the internal combustion engine and also by the electric machine.

The distinguishing feature of the method is that to close the open clutch when the internal combustion engine is initially switched off (i.e. at least at the beginning of the closing process) and/or when the electric machine is initially switched off, a driving dynamic based on the driver's behavior is determined and the speed of the electric machine is adjusted as a function of the driving dynamic determined, in such manner that the clutch is filled by the hydraulic pump the more rapidly, the higher the driving dynamic determined is. The closing of the open clutch when the internal combustion engine is initially closed and the associated adjustment of the speed of the electric machine can take place, for example, when starting off from rest or at the end of a coasting operation. During a coasting operation the clutch is open while the vehicle is moving.

In a simple manner the method according to the invention enables more rapid filling and hence more rapid closing of the clutch when the driver is not greatly concerned about comfort or wants a high degree of spontaneity when actuating the clutch. The term 'driver's behavior' used above is to be understood in a broad sense and can for example refer to an explicitly specified driver's wish defined by the driver by way of a user interface. In a variant of the invention it can be established, for example via the user interface, which driving mode the driver wants (such as sporty mode, normal mode or comfort mode). In a particularly preferred embodiment the driving dynamic is determined on the basis of an acceleration demand by the driver, the driving dynamic being the higher, the greater the acceleration demand is. Preferably the acceleration demand is specified by actuating an accelerator or gas pedal, and no actuation of the accelerator pedal signifies an acceleration demand of zero. A more intense actuation of the accelerator pedal is related to a higher driving dynamic. In particular, the actuation is more intense when the accelerator pedal is moved through a larger distance or is pressed more rapidly.

In a further preferred variant of the method according to the invention, to close the open clutch when the internal combustion engine is initially switched off the speed of the electric machine is increased as a function of the driving dynamic determined, the more rapidly per unit of time and/or to a higher level, the higher is the driving dynamic determined. In this way the clutch closing process can be adapted in a simple manner to the desired driving dynamic.

In a particularly preferred embodiment, the method according to the invention is used to operate a parallel hybrid drive-train in which the torque of the electric machine can be transmitted for driving the vehicle to the drive output and the internal combustion engine can be decoupled from the drive-train by a clutch element between the internal combustion engine and the electric machine. This clutch element is a clutch element other than the clutch described above and serves, when it is opened, to enable the drive-train to be powered by the electric machine on its own, in accordance with the hybrid strategy.

In a further preferred embodiment the method according to the invention is used to operate a drive-train having a dual-clutch transmission as its transmission device. In such a transmission device the clutch can be actuated and shifting processes can be carried out by the hydraulic pump alone, the latter being driven by the internal combustion engine and the electric machine. In other words, no auxiliary pump is needed.

In another embodiment of the method according to the invention the drive-train drives a first axle of the vehicle, in particular the rear axle, whereas a second axle of the vehicle, in particular the front axle can be driven by a further electric machine. With such a drive-train the open clutch can be closed when the internal combustion engine is initially switched off and the associated adjustment of the speed of the electric machine carried out just when the further electric machine is driving the second axle. Thus, the closing of the clutch serves to connect the drive-train for driving the first axle while the vehicle is moving.

In a further, particularly preferred embodiment, particularly rapid gear engagement is enabled by the transmission device. This is achieved in that when it is required to engage a gear while the vehicle is at rest with the clutch open and the internal combustion engine switched off, the speed of the electric machine is set to a value which is lower than a specified idling speed of the internal combustion engine. In this case the gear is engaged in response to the engagement command with superimposed transmission synchronization. By setting the speed of the electric machine at a level which is low and under the idling speed, the transmission input shaft is brought into motion at a low speed by drag torques in the clutch and can therefore be braked more quickly to zero speed for synchronizing the transmission. This shortens the synchronization time.

In a particularly preferred embodiment, when it is required to engage a gear while the vehicle is at rest, the clutch is open and the internal combustion engine is switched off, the speed of the electric machine is set to a value at which the hydraulic pump driven by the electric machine provides a pressure in the hydraulic fluid circuit still just sufficient for engaging the gear, so that the gear is engaged in response to the engagement demand with superimposed transmission synchronization by means of the hydraulic fluid circuit. This variant of the invention enables particularly short synchronization times when engaging a gear.

Besides the method described above the invention concerns a device for operating a drive-train of a vehicle, wherein the drive-train comprises an internal combustion engine whose torque, for driving the vehicle, can be transmitted to a drive output of the drive-train by way of a transmission device provided in the drive-train with a hydraulically actuated clutch, when the clutch is in its closed condition. An electric machine is also provided, whose torque can act on the drive-train. The clutch is closed by filling it with hydraulic fluid from a hydraulic fluid circuit, delivered by a hydraulic pump that can be powered by the internal combustion engine and the electric machine. The device according to the invention comprises a control unit designed such that by means of the control unit the method according to the invention or one or more preferred embodiments of the method according to the invention can be carried out.

Furthermore the invention concerns a vehicle, in particular a motor vehicle, which comprises the device according to the invention for operating a drive-train.

BRIEF DESCRIPTION OF THE DRAWINGS

Example embodiments of the invention are described in detail below with reference to the attached figures, which show.

DETAILED DESCRIPTION OF THE DRAWINGS

Figure 1:
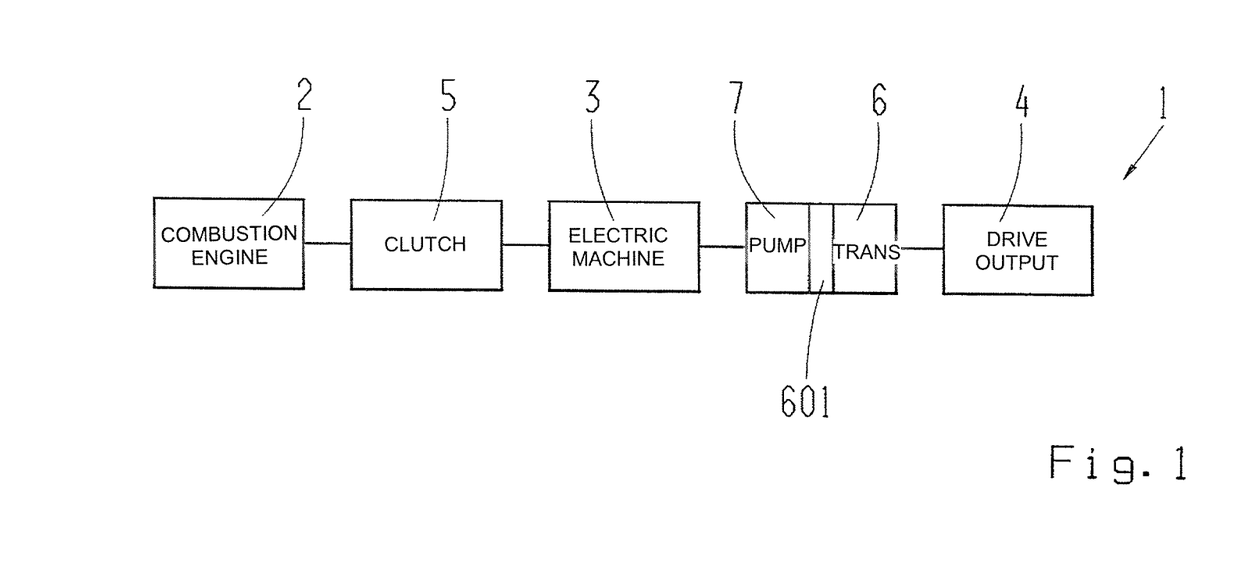
FIG. 1: A schematic representation of a hybrid drive-train of a vehicle, which can be operated using the method according to the invention.

Below, the method according to the invention for operating a parallel hybrid drive-train as represented schematically in FIG. 1 is described. The drive-train 1 comprises an internal combustion engine 2 and an electric machine 3, whose torques can be transmitted to a drive output 4 of the drive-train 1. Between the internal combustion engine 2 and the electric machine 3 is arranged a clutch element 5 by which the internal combustion engine 2 can be connected to the electric machine 3 in a rotationally fixed manner or the internal combustion engine 2 can be decoupled from the remainder of the vehicle hybrid drive. This enables purely electric driving of the vehicle when the clutch element 5 is open.

In addition the drive-train 1 comprises, between the electric machine 3 and the drive output 4, a transmission device 6 in the form of a dual-clutch transmission with a corresponding dual clutch 601. For carrying out shifting processes and actuating the clutch 601 the transmission is coupled to a hydraulic fluid circuit (not shown), and to provide sufficient pressure in the hydraulic fluid circuit, a hydraulic pump 7 is provided. The hydraulic pump is driven exclusively by the internal combustion engine and the electric machine. Other than the pump 7, no additional pump is provided for supplying the transmission with hydraulic fluid, for example when the internal combustion engine and the electric machine are switched off. Since, in contrast to a variable-speed automatic transmission, in a dual-clutch transmission only one clutch has to be filled, the pump 7 that can be driven by the internal combustion engine and the electric machine is enough for providing sufficient system pressure.

In the embodiment described here, the drive-train 1 illustrated in FIG. 1 is used for powering the rear axle of a vehicle. In this case the vehicle also has a further electric machine (not shown), with which the front axle of the vehicle can be driven. When the vehicle is started, as a rule at first only the front axle is driven, i.e. with the internal combustion engine 2 and the electric machine 3 switched off, the clutch 601 is at first open and is only closed at higher speeds in order to thereby drive the rear axle of the vehicle by means of the internal combustion engine 2 and the electric machine 3.

Figure 2:
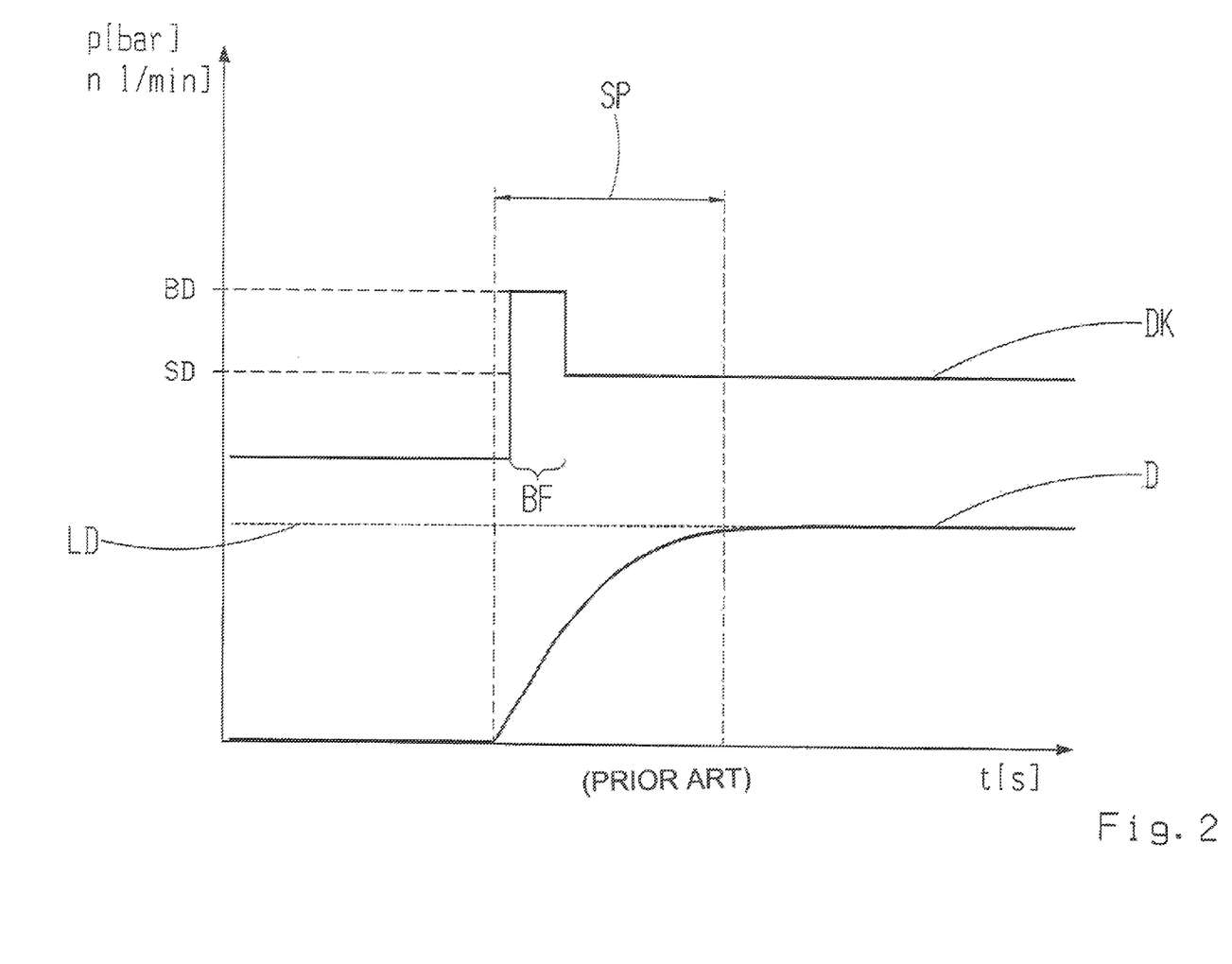
FIG. 2: A diagram to clarify the filling of a clutch in a drive-train according to the prior art.

FIG. 2 shows a diagram to clarify the connection of the drive-train by filling the clutch 601 in accordance with a conventional method. In FIG. 2 and also in the further FIGS. 3 and 4 the time t in seconds is plotted along the abscissa, whereas along the ordinate, in the upper portion of the diagram is plotted the hydraulic pressure of the clutch (line DK) in bar, while in the lower portion of the diagram the speed of the electric machine 3 (line D) in revolutions per minute is plotted. Furthermore, the line LD indicates the idling speed of the internal combustion engine 2. Before the connection of the drive-train the clutch 601 is open and the internal combustion engine 2 and the electric machine 3 are switched off, i.e. their speeds are zero. Consequently there is also no pressure at the clutch, since the pump 7 provided for the transmission device is driven exclusively by the electric machine and the internal combustion engine which, however, are switched off at the time. During the engine starting phase, indicated by the double arrow SP, the electric machine picks up speed with a predetermined gradient, so that thereby a filling pressure BD of about 3.5 bar is built up in the hydraulic fluid circuit and this brings about the filling and closing of the clutch. In this case the filling and closing take place during the time interval marked BF. Once filled, the clutch is closed and the pressure in the clutch falls to a nominal pressure SD of around 1.5 bar. On completion of the engine starting phase the speed of the electric machine is at the level of the idling speed LD of the internal combustion engine, which was started up by the electric machine during the engine starting phase.

The connection of the drive-train according to FIG. 2 always takes place in the same way, i.e. the starting up of the electric machine 3 and the associated filling of the clutch 601 always take place in the same manner and during the same time interval without regard to any other criteria. In contrast, in the context of the method according to the present invention the driver's wish is taken into account when connecting the drive-train in order to drive the rear axle. For this, the driver's wish is preferably deduced from the actuation of the accelerator pedal by the driver. If the accelerator pedal is pressed more rapidly or moved through a larger distance, this is correlated with a driver's wish for a higher driving dynamic. On the other hand a less pronounced or absent actuation of the accelerator pedal is deemed to indicate a driver's wish for greater comfort when connecting the drive-train. As a function of the driving dynamic determined from the driver's wish, the speed of the electric machine 3 is increased in different ways in order, for a low driving dynamic (i.e. greater desire for comfort), to fill the clutch more slowly and, for a higher driving dynamic (i.e. a lesser desire for comfort), to fill the clutch rapidly.

Figure 3:
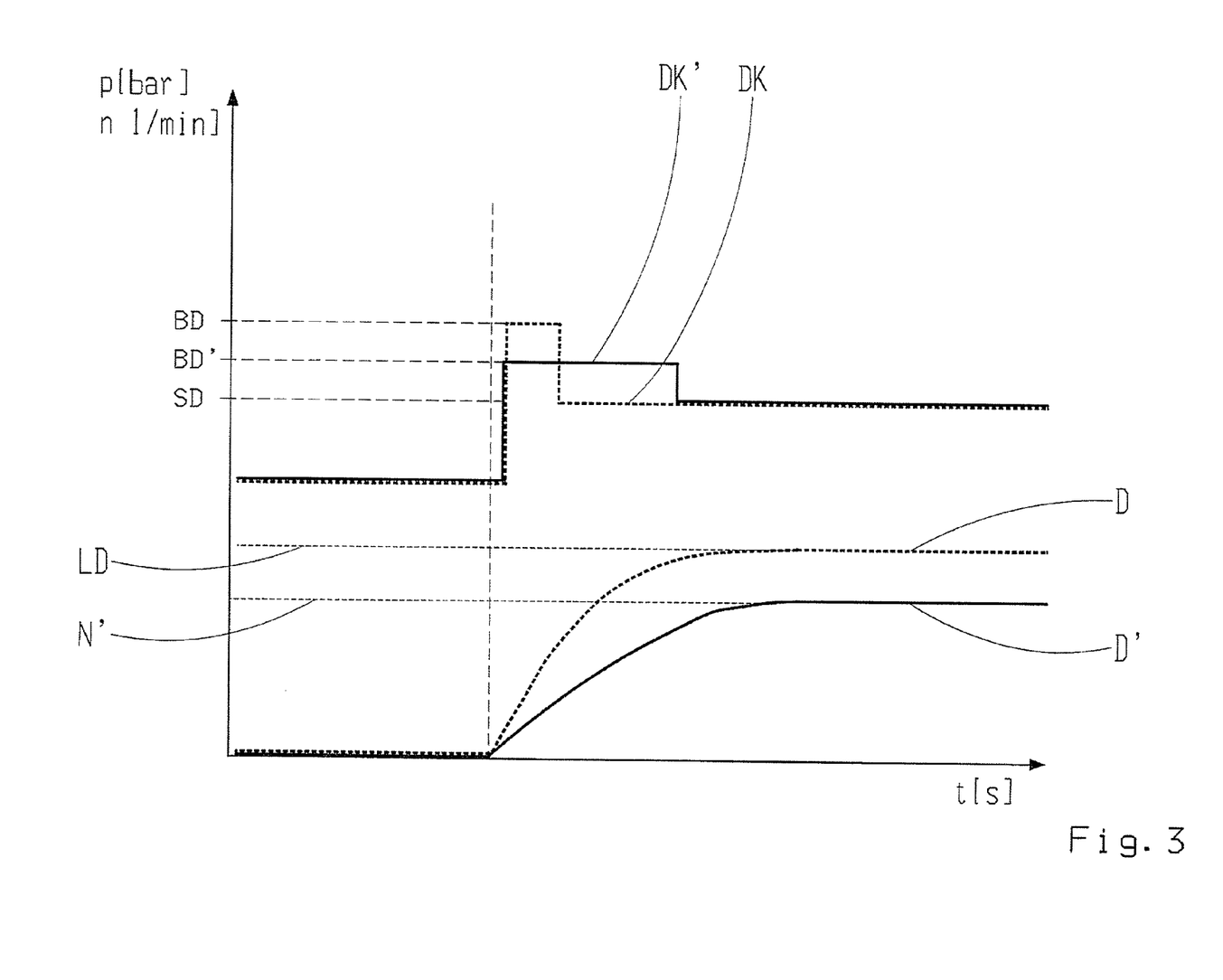
FIG. 3 and FIG. 4: Diagrams showing the filling of a clutch on the basis of a variant of the method according to the invention, for high and for low driving dynamic.

FIG. 3 shows a diagram analogous to FIG. 2, in which the starting up of the electric machine is illustrated by the corresponding continuous lines D¢ and DK¢ for the case of a low driving dynamic and thus a desire for greater comfort. D¢ again represents the speed of the electric machine and DK¢ the hydraulic pressure in the clutch. The speed D and hydraulic pressure DK in FIG. 2 are reproduced in FIG. 3 as dotted lines. As shown in FIG. 3, compared with the speed D the speed D¢ of the electric machine rises with a flatter gradient to a target speed NO which is lower than the idling speed LD of the internal combustion engine. In this case the speed N¢ is chosen such that there is always still a sufficient system pressure in the hydraulic fluid circuit to fill the clutch. In the embodiment described here the lowest possible speed value N¢ is in the range of about 400 revolutions per minute, whereas the idling speed LD is in the range of about 600 revolutions per minute. Owing to the flatter increase of the speed D¢ the clutch is filled with a lower filling pressure BD¢ and thus over a longer time interval, i.e. coupling takes place at a later point in time. Owing to the slower acceleration of the electric machine no starting jerk of the engine can be perceived by the driver, so that the comfort he desires is achieved at the cost of less spontaneity in the connection of the drive-train.

Figure 4:
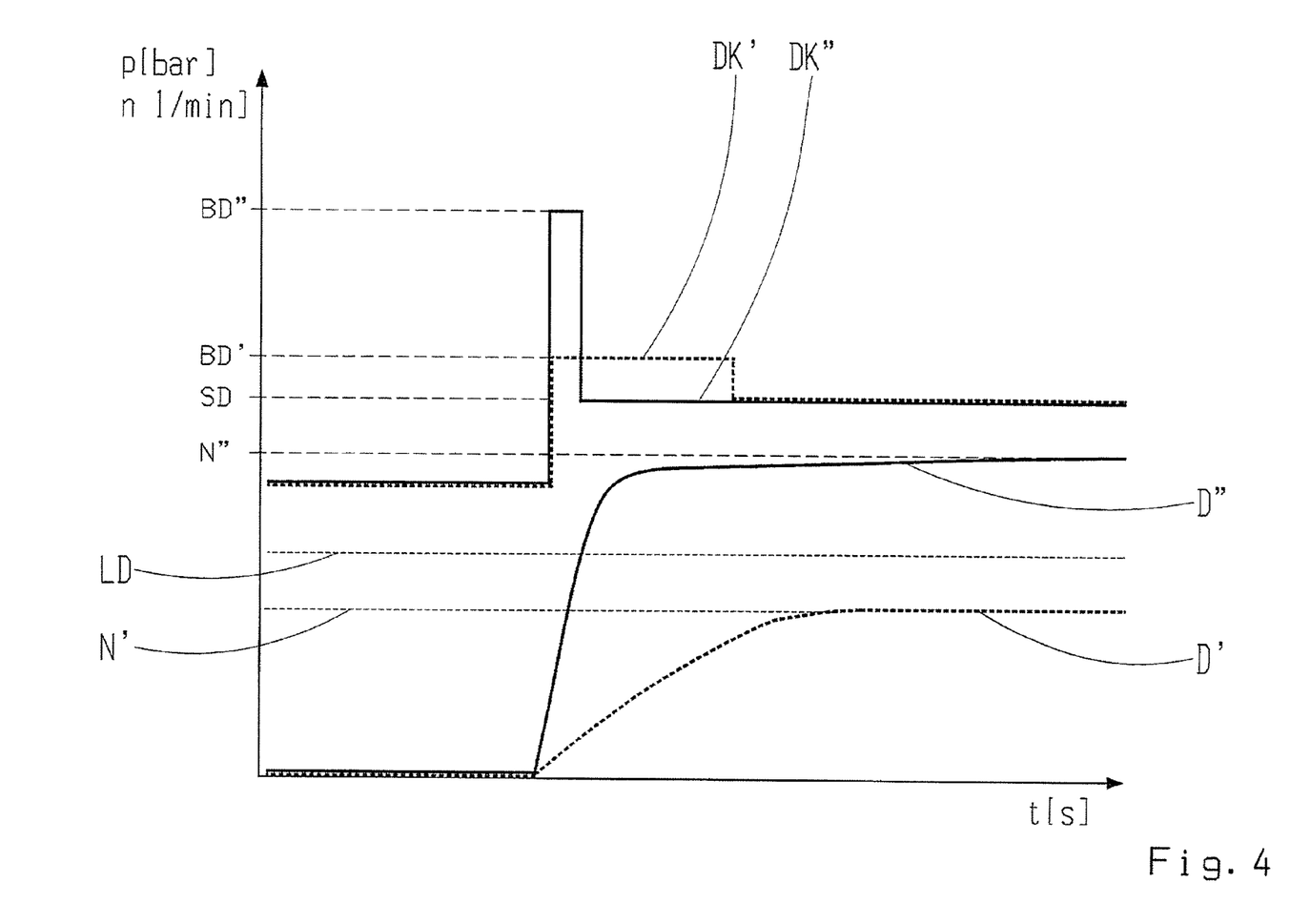

Compared with FIG. 3, FIG. 4 shows a scenario in which the driver wants a higher driving dynamic and hence has less desire for comfort and a greater wish for higher spontaneity when connecting the drive-train to drive the rear axle. In this case the speed of the electric machine and the filling of the clutch are indicated by corresponding continuous lines $D^2$ and $DK^2$. For comparison, FIG. 4 shows the speed D¢ and filling DK¢ for the scenario of FIG. 3 as dotted lines. As can be seen in FIG. 4, compared with the speed D¢ the speed $D^2$ has a substantially steeper gradient up to a substantially higher speed level $N^2$. Consequently the clutch is filled with a higher filling pressure $BD^2$ and this takes place in a substantially shorter time, i.e. the drive-train is connected for driving the rear axle with distinctly greater spontaneity.

As emerges from the above explanations, according to the invention when the clutch of the drive-train is being filled the driving dynamic desired by the driver is suitably taken into account. In a preferred embodiment, moreover, when engaging a gear in the dual-clutch transmission while the vehicle is at rest a strategy is used, which ensures that the gear is engaged as quickly as possible. Such a variant is illustrated in the schematic diagram of FIG. 5.

Figure 5:
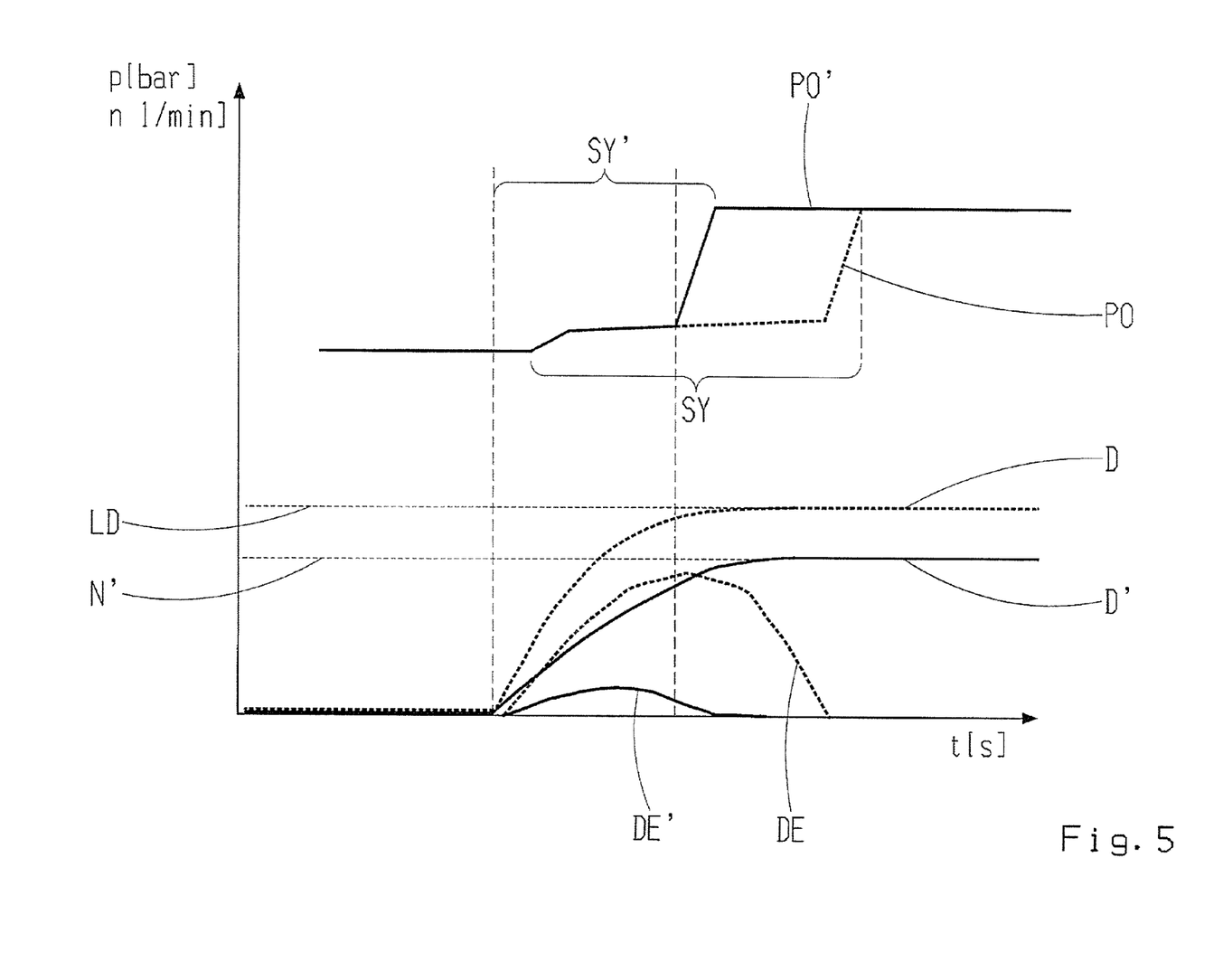
FIG. 5: A diagram to clarify the synchronized engagement of a gear when the vehicle is at rest, in accordance with an embodiment of the method according to the invention.

In the lower portion of FIG. 5, the speed D or D¢ of the electric machine 3 is again indicated when it is required to engage a gear while the vehicle is at rest and the electric machine and the internal combustion engine are both switched off. The dotted line D here shows the speed for gear engagement based on a conventional operating strategy, whereas the line D¢ represents the time variation of the speed based on an operating strategy according to the invention. The speed of the electric machine is associated with a corresponding speed of the input shaft of the transmission. The speed of the input shaft for engine speeds D or D¢ is here indicated by the line DE or DE¢ respectively. In contrast to the previous diagrams shown in FIGS. 2 to 4, in the upper portion of FIG. 5 the gearshift rod position for a conventional gear engagement process is indicated by the dotted line PO, and for a gear engagement process according to the invention by the continuous line PO¢. The sections SY and SY¢ indicate respectively the corresponding time intervals for synchronizing the transmission during a conventional gear engagement process and during a gear engagement process according to the invention.

For a gear engagement the electric machine must be running in order to provide a sufficient system pressure in the hydraulic fluid circuit, since besides the above-described filling of the clutch the hydraulic fluid circuit also enables the gear to be engaged. Here, the problem arises that when the electric machine is running, the input shaft to be synchronized is sped up by drag torques of the clutch (even though the clutch is open), and during the synchronization process it has to be braked down to zero again, this being represented by the line DE. The result is a relatively long synchronization time SY.

To make this synchronization time shorter, according to the invention during the engagement of a gear the speed D¢ of the electric machine is adjusted with a smaller time gradient to a level N¢, which is substantially lower than the level of the idling speed LD of the internal combustion engine but is still high enough to produce in the hydraulic fluid circuit a system pressure sufficient for the engagement of the gear. As a consequence the input shaft of the transmission reaches a low speed DE¢ so that the braking of the input shaft to carry out the synchronization can take place substantially more quickly. This results in a substantially shorter synchronization time SY¢.

Once the gear has been engaged in accordance with the scenario of FIG. 5, the clutch can be filled as described earlier with reference to FIGS. 3 and 4. If the filling does not take place immediately after the gear is engaged, the speed of the electric machine is again reduced to zero and then increased having regard to the driving dynamic desired. Likewise it is possible for the speed, starting from its level after the gear has been engaged, to be again maintained or appropriately increased having regard to the driver's wish, in order thereby to bring about the filling of the clutch in accordance with the spontaneity desired.

Figure 6:
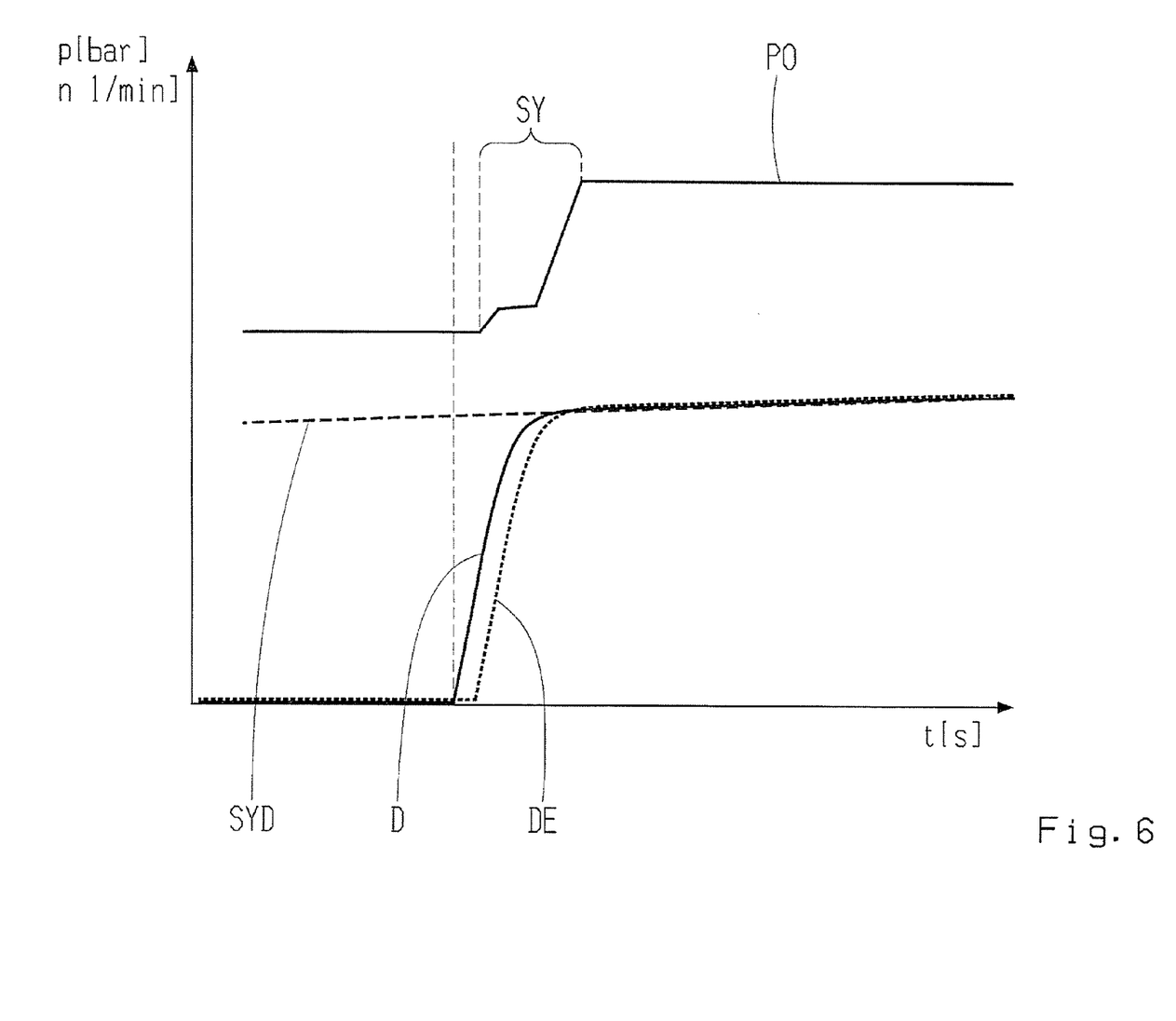
FIG. 6: A diagram illustrating the engagement of a gear during driving operation, in accordance with an embodiment of the method according to the invention.

FIG. 6 shows a diagram analogous to FIG. 5, which illustrates gear engagement during driving operation (for example, at the end of a coasting phase). In this case the continuous line D represents the speed of the electric machine and the dotted line DE the speed of the input shaft of the transmission. The value of the synchronous speed required for engaging the corresponding gear is indicated by the broken line SYD. In the upper portion of the FIG. 6 diagram the position PO of the gearshift rod is again shown. As can be seen in FIG. 6, the speed D of the electric machine is adjusted with a high gradient very rapidly to the synchronous speed SYD, whereby the input shaft is also brought to the synchronous speed as shown by the line DE. Consequently the transmission can be synchronized and the gear therefore engaged in a very short time. The corresponding time interval for synchronization is again indicated by SY.

The embodiments of the invention described above have a series of advantages. In particular, in a vehicle drive-train with an internal combustion engine, an electric machine and a clutch, which can be actuated by a single hydraulic pump by means of the internal combustion engine and the electric machine, the clutch can be closed as a function of a driving dynamic desired by the driver. The behavior of the drive-train and thus of the vehicle is in this way specifically adapted to the driver's wishes. Furthermore, in a special embodiment the process of gear engagement can also be made shorter compared with the prior art by appropriate control of the electric machine.

INDEXES

1 Drive-train
2 Internal combustion engine
3 Electric machine
4 Drive output
5 Clutch element
6 Transmission device
601 Clutch
7 Hydraulic pump
SP Engine start phase
D, D', D" Rotation speed of the electric machine
LD Idling speed of the internal combustion engine
DK, DK', DK" Hydraulic pressure in the clutch
BF Filling process
SD Nominal clutch pressure
BD, BD', BD" Clutch filling pressure
N, N', N" Speed level of the electric machine
SY, SY' Synchronization time
PO, PO' Shift rod position
SYD Synchronous speed
DE, DE' Rotation speed of the transmission input shaft
n Rotation speed
p Pressure
s Path, position
t Time

The invention claimed is:

1. A method of operating a drive-train (1) of a vehicle, wherein the drive-train (1) comprises an internal combustion engine (2) whose torque for driving the vehicle is transmittable to a drive output (4) of the drive-train (1) by way of a transmission device (6) provided in the drive-train (1), with a hydraulically actuated clutch (601), when the clutch (601) is in an engaged condition, an electric machine (3) is connectable to the drive-train (1) so as to provide torque thereto, the clutch (601) being engaged by filling the clutch with hydraulic fluid from a hydraulic fluid circuit via a pump (7) which is drivable by the internal combustion engine (2) and the electric machine (3), the method comprising the steps of:

initiating engaging of the clutch (601) when at least one of the internal combustion engine (2) and the electric machine (3) is initially switched off;

determining a driving dynamic based upon driver input which is defined via an interface and is indicative of driver behavior;

adjusting a speed (D', D") of the electric machine (3) as a function of the determined driving dynamic such that filling of the clutch (601), by the pump (7), occurs more rapidly the greater the determined driving dynamic is; and when required to engage a gear while the vehicle is at rest, the clutch (601) is disengaged and the internal combustion engine (2) switched off, setting the speed of the electric machine (3) at a value lower than a specified idling speed of the internal combustion engine (2) and engaging the gear, in response to an engagement demand, with a superimposed transmission synchronization by way of the hydraulic fluid circuit.

2. The method according to claim 1, further comprising the step of determining the driving dynamic on the basis of an acceleration demand by the driver such that the driving dynamic being increased the greater the acceleration demand is, and the acceleration demand depending on actuation of an accelerator pedal.

3. The method according to claim 1, further comprising the step of increasing the speed (D', D") of the electric machine (3), as a function of the determined driving dynamic, to engage the clutch (601) when the internal combustion engine (2) is initially switched off, and increasing the speed (D', D") of the electric machine at least one of more rapidly in time and to a higher level the greater the determined driving dynamic is.

4. The method according to claim 1, further comprising the step of operating the drive-train (1) as a parallel hybrid drive-train, with which the torque of the electric machine (3) for driving the vehicle is transmittable to the drive output (4) and the internal combustion engine (2) is disconnectable from the drive-train (1) by a clutch element (5) located between the internal combustion engine (2) and the electric machine (3).

5. The method according to claim 1, further comprising the step of operating the drive-train (1) with the transmission device (6) operating as a dual-clutch transmission.

6. The method according to claim 1, further comprising the step of driving the vehicle by driving a first axle thereof with the drive-train (1) and driving a second axle of the vehicle by a further electric machine.

7. A method of operating a drive-train (1) of a vehicle, wherein the drive-train (1) comprises an internal combustion engine (2) whose torque for driving the vehicle is transmittable to a drive output (4) of the drive-train (1) by way of a transmission device (6) provided in the drive-train (1), with a hydraulically actuated clutch (601), when the clutch (601) is in an engaged condition, an electric machine (3) is connectable to the drive-train (1) so as to provide torque thereto, the clutch (601) being engaged by filling the clutch with hydraulic fluid from a hydraulic fluid circuit via a pump (7) which is drivable by the internal combustion engine (2) and the electric machine (3), the method comprising the steps of:

initiating engaging of the clutch (601) when at least one of the internal combustion engine (2) and the electric machine (3) is initially switched off;

determining a driving dynamic based upon driver input which is defined via an interface and is indicative of driver behavior;

adjusting a speed (D', D") of the electric machine (3) as a function of the determined driving dynamic such that filling of the crutch (601), by he pump (7), occurs more rapidly the greater the determined driving dynamic is; and driving the vehicle by driving a first axle thereof with the drive-train (1) and driving a second axle of the vehicle by a further electric machine.

8. A method of operating a drive-train (1) of a vehicle, wherein the drive-train (1) comprises an internal combustion engine (2) whose torque for driving the vehicle is transmittable to a drive output (4) of the drive-train (1) by way of a transmission device (6) provided in the drive-train (1), with a hydraulically actuated clutch (601), when the clutch (601) is in an engaged condition, an electric machine (3) is connectable to the drive-train (1) so as to provide torque thereto, the clutch (601) being engaged by filling the clutch with hydraulic fluid from a hydraulic fluid circuit via a pump (7) which is drivable by the internal combustion engine (2) and the electric machine (3), the method comprising the steps of:

initiating engaging of the clutch (601) when at least one of the internal combustion engine (2) and the electric machine (3) is initially switched off;

determining a driving dynamic based upon driver input which is defined via an interface and is indicative of driver behavior;

adjusting a speed (D', D") of the electric machine (3) as a function of the determined driving dynamic such that filling of the clutch (601), by the pump (7), occurs more rapidly the greater the determined driving dynamic is; and when required to engage a gear while the vehicle is at rest, the clutch (601) is disengaged and the internal combustion engine (2) switched off, setting the speed of the electric machine (3) to a value at which the hydraulic pump (7), driven by the electric machine (3), produces pressure in the hydraulic fluid circuit that is sufficient to facilitate engagement of the gear, and engaging the gear in response to an engagement demand with superimposed transmission synchronization by way of the hydraulic fluid circuit.

* * * * *